United States Patent [19]

Asanagi et al.

[11] 4,178,348

[45] Dec. 11, 1979

[54] PROCESS FOR REMOVING SULFUR OXIDES IN EXHAUST GASES

[75] Inventors: Etsuo Asanagi, Kashiwa; Hideo Idemura, Tokyo, both of Japan

[73] Assignee: Chiyoda Chemical Engineering & Construction Company, Ltd., Kanagawa, Japan

[21] Appl. No.: 805,156

[22] Filed: Jun. 9, 1977

[30] Foreign Application Priority Data

Jun. 10, 1976 [JP] Japan ................................. 51-67047

[51] Int. Cl.² ............................................... C01B 17/00
[52] U.S. Cl. .................................... 423/242; 423/166
[58] Field of Search ............................. 423/242, 166

[56] References Cited

U.S. PATENT DOCUMENTS

| | | | |
|---|---|---|---|
| 3,883,639 | 5/1975 | Cartwright et al. | 423/242 |
| 3,904,742 | 9/1975 | Akimoto | 423/242 X |
| 3,914,387 | 10/1975 | Jordan et al. | 423/242 |
| 3,920,794 | 11/1975 | LaMantia et al. | 423/242 |
| 3,980,756 | 9/1976 | Dixson et al. | 423/242 |
| 3,983,217 | 9/1976 | Muraki et al. | 423/242 |
| 4,046,856 | 9/1977 | Itoo et al. | 423/242 |

Primary Examiner—O. R. Vertiz
Assistant Examiner—Gregory A. Heller
Attorney, Agent, or Firm—Armstrong, Nikaido, Marmelstein & Kubovcik

[57] ABSTRACT

This invention relates to a process for desulfurization of exhaust gases containing sulfur oxides. More particularly, it relates to a process which can continuously put in operation to remove the sulfur oxides in exhaust gases in an efficient manner using a slurry of gypsum containing specified sulfate(s) within a single apparatus and can at the same time obtain gypsum as by-product.

3 Claims, 3 Drawing Figures

PROCESS FOR REMOVING SULFUR OXIDES IN EXHAUST GASES

BACKGROUND OF THE INVENTION

Recently, the use of sulfur-containing fuels such as heavy oil, etc. has remarkably increased, so that when they are combusted harmful sulfur oxides such as $SO_2$, $SO_3$, etc. are formed in the exhaust combustion gas, presenting a severe social problem on public nuisance, and therefore, the development of an efficient process for their removal is being earnestly desired. As the wet processes for desulfurization of exhaust gases aimed at the prevention of public nuisance there have been proposed ammonia process, lime process, soda process, etc., and fairly most of them have already reached the stage of practical utilization, but all of them have their merits and demerits. Since the quantity of sulfur recovered for the removal of sulfur oxides is enormous, it can readily be imagined that with full operation of the desulfurization process the sulfur by-product will rapidly run into an over-supply and in future its supply-demand balance will eventually collapse. Thus, it becomes necessary that the sulfur compound is recovered in the form suited to mass consumption as well as to safe disposal. In this regard it is considered that gypsum is one of the products meeting such requirements. Gypsum has many advantages such that it is much in demand, harmless, incombustible, and chemically stable, and it can be disposed as waste material in land reclamation without the danger of secondary public nuisance, and moreover, the lime used as its neutralizing agent is not only exceptionally cheap as compared with other neutralizing agents, but also readily available in a long-lasting steady state.

DESCRIPTION OF PRIOR ART

In order to recover gypsum in the exhaust gas desulfurization process the following processes are in practice: lime-gypsum process wherein an aqueous solution of lime is used directly as an absorbent; substitution process wherein aqueous solutions of sodium sulfite, sodium acetate, ammonia, etc. are used as absorbents; and sulfuric acid process wherein dilute sulfuric acid is used as an absorption liquid. In these processes the efficient removal of sulfur oxides and the high utilization of lime are considered as the prerequisites at all events, so that how to simplify the steps keeping the operation in a steady state for the economical manufacture of gypsum in the desulfurization process is now an important problem.

In the lime-gypsum process, since the absorption reaction of sulfur dioxide is controlled by the rate of dissolution of the lime in the form of a slurry, said slurry has no buffering effect upon the pH, and hence the absorption efficiency is poor in the acidic region. As a result it becomes necessary that in order to enhance the rate of absorption of sulfur dioxide either the lime is added in excess of its chemical equivalent so as to make the absorption tower operable in more alkaline region, or the absorption tower is made of the multi-stage scrubbing type. On the other hand, the scaling of the absorption tower occurs severely on the side of the alkaline region, but it rarely occurs below pH 4.5 on the acidic side. In other words, in the lime-gypsum process the absorption capacity and the occurrence of scaling are antagonistic conditions, and this makes the largest drawback in said process. Also, there has been proposed another lime-gypsum process for desulfurization, which treats the exhaust gas containing sulfur dioxide with a slurry absorbent containing lime, characterized by that said exhaust gas is contacted with said slurry absorbent whose pH has been adjusted to below 5 in the presence of oxygen gas whereby the absorption and oxidation of sulfur dioxide and the by-production of gypsum are accomplished in one step, but as in this process the absorption capacity of sulfur dioxide is low, the process has a drawback that it is applicable only to the treatment of the exhaust gas in which the concentration of sulfur dioxide is as low as 500 ppm.

The formation of gypsum is carried out in either of the following two methods: the method wherein sulfur dioxide is absorbed with the calcium source to give a calcium sulfite slurry, which is subsequently oxidized, and the method wherein the bisulfite ion and the sulfite ion formed by the absorption of sulfur dioxide are once oxidized to bisulfate ion and sulfate ion, which are subsequently reacted with the calcium source. Since the former oxidation reaction is carried out in a heterogeneous reaction it has a disadvantageous point that the reaction requires special condition. On the other hand, the latter process, in which sulfur dioxide is absorbed in the absorption liquid to give sulfate ion by oxidation, and simultaneously with its neutralization and activation by lime, gypsum is recovered, has various advantageous points such that (1) the reaction is very easy because of the oxidation reaction being a homogeneous reaction, (2) the occurrence of scaling in the absorption-oxidation step is so rare that no trouble arises from it, (3) since the bisulfite ion and the sulfite ion in the recycling solution are recycled after having been oxidized to bisulfate ion and sulfate ion the vapor pressure of sulfur dioxide is considerably low even when the pH of the solution is less than 4, and so on, so that it is an attractive process, and there have been proposed processes for desulfurization of exhaust gases using dilute sulfuric acid, and aqueous solutions containing ammonium sulfate, sodium acetate, etc. as the absorption liquid. But in any of these processes it is found that a difficult problem remains to be solved owing to the respective characteristic feature of the process. That is to say, in the process using dilute sulfuric acid as the absorption liquid, gypsum can be obtained by the use of cheap limestone as the lime in the step of producing gypsum by neutralization with lime, but because of the low pH of the absorption liquid, in order to completely absorb the sulfur dioxide gas in the exhaust gas it is necessary to make the value of the liquid gas ratio (L/G) large. Also, in the process using an aqueous solution of ammonium sulfate as the absorbent, when the sulfur dioxide gas in the exhaust gas to be treated is dilute, the pH of the solution is within the range of 3-4 in operation, so that the operation is possible with a low liquid gas ratio (L/G), but as it is required that quick lime or slaked lime is used in the reaction of the sulfate ion and bisulfate ion with lime, it is impossible to obtain gypsum by completely reacting the sulfate ion and bisulfate ion in the solution with cheap limestone. Further, since the sulfur dioxide in the exhaust gas is absorbed according to the reaction represented by equation (1), the absorption capacity of sulfur dioxide in the pH of solution ranging from 4-3 is low, so that if the concentration of sulfur dioxide in the exhaust gas is high, the liquid gas ratio (L/G) in the absorption step should be made large.

$$SO_4^{2-} + SO_2 + H_2O = HSO_4^- + HSO_3^- \quad (1)$$

Also, in the process using an aqueous solution of sodium acetate as the absorption liquid, it is possible that in the gypsum step cheap limestone is used to obtain gypsum according to the reaction represented by equation (2), but as in this process the absorption step and the oxidation step of sulfur dioxide are provided, and the sulfur dioxide gas in the exhaust gas is absorbed according to the reactions represented by equations (3)–(6) to form sulfate ion and bisulfate ion, there is formed emission of free acetic acid, which requires an additional step of acetic acid removal to remove this emission. Since this de-emission is carried out by the use of lime slurry, difficulty arises in operation.

$$SO_4^{2-} + CaCO_3 + 2CH_3COOH = CaSO_4 + 2CH_3COO^- + CO_2 + H_2O \quad (2)$$

$$2CH_3COO^- + SO_2 + H_2O = SO_3^{2-} + 2CH_3COOH \quad (3)$$

$$CH_3COO^- + SO_2 + H_2O = HSO_3^- + CH_3COOH \quad (4)$$

$$2SO_3^{2-} + O_2 = 2SO_4^{2-} \quad (5)$$

$$2HSO_3^- + O_2 + 2CH_3COO^- = 2SO_4^{2-} + 2CH_3COOH \quad (6)$$

$$2CH_3COOH + CaCO_3 = 2CH_3COO^- + Ca^{2+} + CO_2 + H_2O \quad (7)$$

The present inventors formerly examined and investigated problems concerning the improvement in the treating capacity, the compactness of apparatus, and the removal of chloride and the recovery of metal ions such as heavy metals, magnesium, etc. that accompany the exhaust gases or are contaminated with the impurities in the lime in the desulfurization process by lime substitution, and as a result they could establish a desulfurization process using aqueous solutions of zinc sulfate and/or copper sulfate as the absorption liquid, which was applied for patents as Japanese patent applications Nos. 105495/1974 (Public Disclosure 32495/1976; Patent Publication 15477/1977) and 105496/1974 (Public Disclosure 32491/1976; Patent Publication 15478/1977).

SUMMARY OF THE INVENTION

Then, the inventors further made an elaborate investigation in an attempt to establish a desulfurization process excellent in the desulfurization efficiency, being accompanied by the economical production of gypsum, wherein not only can the limestone including the cheapest dolomitic limestone be used as the neutralizing agent, but also the desulfurization step can be simplified to ensure a continuously steady operation, and finally by limiting the value of pH to 4–2.5, narrowing the suitable pH range in conformity with the characteristic principle of the absorption liquid in the prior patent application they could succeed in establishing an epoch-making process of this invention wherein the absorption step and the oxidation step of the sulfur oxides and the formation step of gypsum can be achieved within a single apparatus.

DETAILED DESCRIPTION OF THE INVENTION

That is to say, this invention relates to a process for desulfurization of exhaust gases containing sulfur oxides, characterized by that the exhaust gas is contacted with a slurry of gypsum acidified with sulfuric acid to pH 4–2.5, which contains sulfates of zinc, copper, or magnesium singly or in mixtures, in the presence of oxygen within a single apparatus, and then lime is added so as to effect the absorption and oxidation of said sulfur oxides and the deposition of gypsum simultaneously. The sulfates of zinc, copper, or magnesium that are added to the absorption liquid in this invention, when they are present singly or in mixtures, have an effect of promting the smooth desulfurization of the exhaust gases by remarkably improving the absorbability and the removal efficiency of the sulfur oxides contained in the exhaust gases as a result of imparting the buffering ability for pH to the absorption liquid. The sulfur dioxide in the exhaust gas is absorbed according to the reaction represented by equation (1), and is oxidized according to equation (9) while the $SO_3$ is absorbed by the reaction of equation (8). The $SO_3$ contained in combustion gas is usually 3–4% on the basis of the sulfur dioxide.

$$SO_4^{2-} + SO_3 + H_2O = 2HSO_4^- \quad (8)$$

The sulfur dioxide absorbed is oxidized by oxygen to give bisulfate ion in a homogeneous reaction according to the reactions represented by equation (9) without intermediate formation of calcium sulfite in a slurried form, and the bisulfate ion thus formed yields gypsum by reacting with lime according to the reaction represented by equation (10), and at the same time the solution is activated. As the lime to be added use can be made of limestone, quick lime, slaked lime, or mixtures thereof, but the use of limestone is most advantageous from the viewpoint of economy as well as from the aspect of the operation.

The quantity of the lime to be added is such that the pH of the absorption liquid can maintain the value between 4–2.5, and it is preferable that the lime is continuously added in an amount nearly the same as the chemical equivalent to the sulfur dioxide in the exhaust gas to be treated.

$$2HSO_3^- + O_2 = 2HSO_4^- \quad (9)$$

$$2HSO_4^- + CaCO_3 + H_2O = SO_4^{2-} + CaSO_4 \cdot 2H_2O + CO_2 \quad (10)$$

After all, as the overall reaction the sulfur dioxide and $SO_3$ in the exhaust gas react with lime to yield gypsum according to the reactions represented by equations (11) and (12), respectively.

$$SO_2 + \tfrac{1}{2}O_2 + CaCO_3 + 2H_2O = CaSO_4 \cdot 2H_2O + CO_2 \quad (11)$$

$$SO_3 + CaCO_3 + 2H_2O = CaSO_4 \cdot 2H_2O + CO_2 \quad (12)$$

The reason why the solutions of sulfates of zinc, copper, or magnesium singly or in mixtures are used as the additive to the absorption liquid in this invention resides in the utilization of their buffering ability as versatile salts as well as in the ease with which the copper and zinc in the added salts are separated for recovery when the objectionable matters contaminated with the impurities in the exhaust gas and the lime that are accumulated during a long term operation are to be removed. Since magnesium is present as an impurity in natural limestone, when limestone is added for the activation of the solution the magnesium acts as the neutralizing agent of the solution according to the reaction of equation (13) and at the same time this economically replenishes the solution with the salt additive.

These metal compounds may also be added in the form of compounds such as oxides, hydroxides, or carbonates other than the sulfates so as to react with the sulfuric acid in the solution to give sulfates.

$$2HSO_4^- + MgCO_3 = 2SO_4^{2-} + Mg^{2+} + CO_2 + H_2O \quad (13)$$

The solution obtained by separating gypsum from the absorption slurry can be recycled repeatedly as the absorption liquid of sulfur oxides, but in order to prevent the accumulation of the objectionable matters therein portion of the solution is withdrawn and then neutralized and made innocuous before it is discharged. In this case the magnesium sulfate is also discharged at the same time out of the system, so that the quantity of the magnesium sulfate in the absorption liquid is well balanced. If necessary, the magnesium sulfate can also be reused by recovering from the withdrawn solution. In the removal of the objectionable matters accumulating in the absorption liquid zinc and copper can be separated as precipitate when the solution is neutralized, and they can be used repeatedly as the additive to the absorption liquid without a loss, so that they are economical. The reaction formulas forming precipitates by the neutralization of zinc and copper with quick lime are represented by equations (14) and (15).

$$Zn^{2+} + SO_4^{2-} + CaO + 3H_2O = Zn(OH)_2 + CaSO_4 \cdot 2H_2O \quad (14)$$

$$Cu^{2+} + SO_4^{2-} + CaO + 3H_2O = Cu(OH)_2 + CaSO_4 \cdot 2H_2O \quad (15)$$

As one example of the objectionable matters accumulating in the solution chloride ion may be mentioned. Since chloride ion causes pitting in stainless steel material, its ionic concentration must be controlled.

The present desulfurization process is operated by adjusting the pH of the absorption liquid slurry in a range of 4.0–2.5 at all times, but as the pH varies depending on the particular kind and concentration of the acid components such as sulfuric acid, sulfurous acid, etc. that are present in the slurry it is controlled by the balancing ratio of these acid components to the cationic components such as zinc, copper, and magnesium (including $Fe^{2+}$, $Co^{2+}$, $Ni^{2+}$, $Mn^{2+}$, etc. that are used as catalyst). The largest reason why the pH of the absorption liquid slurry should be 4–2.5 is that it is essential to carry out the reaction in a single apparatus, and above pH 4, the pH of the liquid can hardly be adjusted to a stable pH owing to the action of the coexisting lime, and moreover above pH 4.5, a precipitate of calcium sulfite is formed, and as a result the smooth oxidation reaction of calcium sulfite is hindered, whereas in order to accomplish the neutralization and absorption of sulfur dioxide gas in an efficient manner so as to smoothly oxidize the absorbed sulfur dioxide gas into bisulfate ion it is necessary to make the pH of the liquid 2.5 or more. When the pH of the absorption slurry is below 2.5, a large quantity of catalyst is required for the complete oxidation of the absorbed sulfur dioxide gas. Although the concentration of the catalyst varies depending on the kind, when using ferrous ion catalyst in the complete oxidation of the absorbed sulfur dioxide gas, the ferrous ion required is several ten–one hundred ppm in the range of pH 4.5–3, one hundred–several hundred ppm in the range of pH 3–2.5, several hundred–one thousand ppm in the range of pH 2.5–2, and several thousand ppm below pH 2. Furthermore, it has been confirmed by the present inventor's experience that below pH 2.5 no effective action can be expected unless ferric ion as a catalyst is used.

In the process of the invention the slurry absorbent used contains the gypsum solids in a concentration of 0.1–1.5 mole/l (2–20% by weight). The concentration of sulfate used is 0.05–0.5 mole/l (0.5–5% by weight), and besides the above, several ten–several hundred ppm of metal ions such as $Fe^{2+}$, $Ni^{2+}$, $Co^{2+}$, $Mn^{2+}$, etc. are also contained as catalyst in the absorption slurry. When the concentration of the gypsum solids in the slurry absorbent is less than 0.1 mole/l, the volume of the slurry fed to the gypsum separator becomes so large that an increased load necessitates use of a separator of larger size, whereas when the concentration of the gypsum solids is taken to be more than 1.5 mole/l, the apparent viscosity becomes so high that the gas-liquid contact, dispersion, etc. are adversely affected, therefore the concentration of the solids should be 0.1–1.5 mole/l. In addition, when the concentration of the particular sulfate added is less than 0.05 mole/l, the buffering action for the pH of the liquid is poor in the range of pH 4.0–2.5 in the absorption slurry most adapted, while above 0.5 mole/l the effect of the increase in the concentration of the salt added tends to level off, so that 0.05–0.5 mole/l is desirable from the economical viewpoint.

DESCRIPTION OF THE PREFERRED EMBODIMENT

Now, with reference to some experimental data the effect of the sulfate added to the absorption liquid as well as the effect of the existing oxygen will be explained below.

Figure 1:
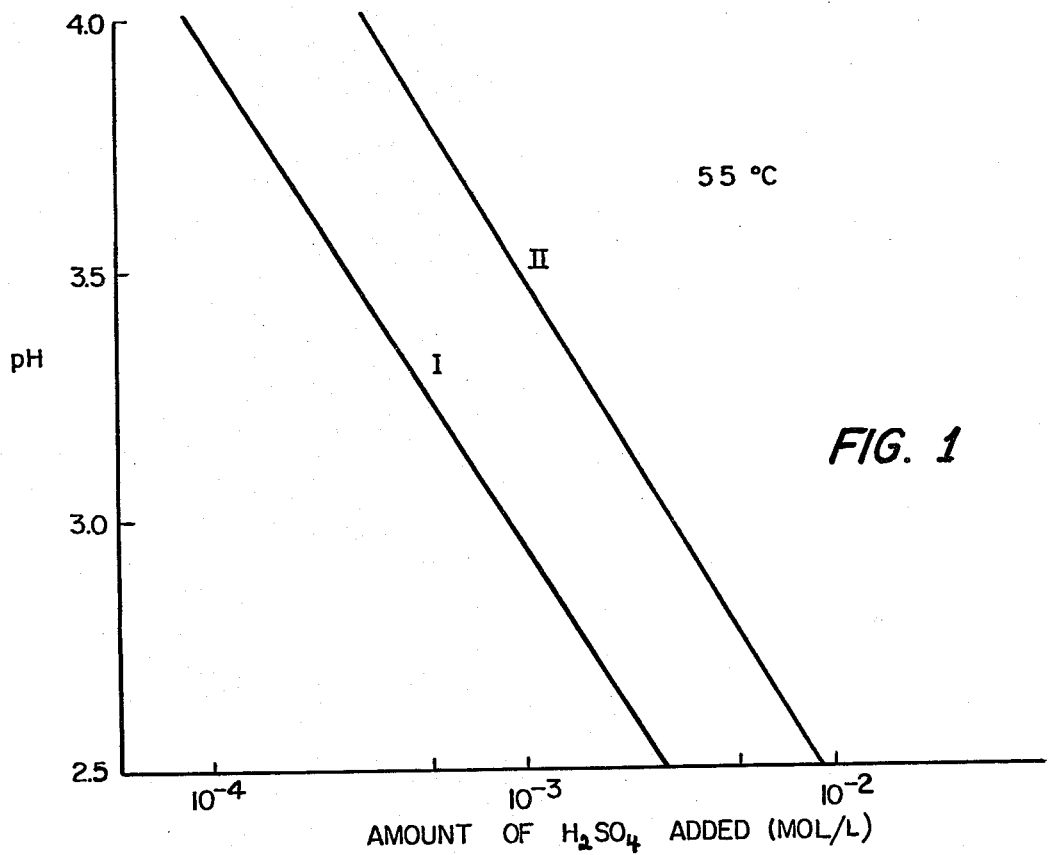
FIG. 1 represents the variation in the pH value observed when sulfuric acid is added to a slurry containing 0.3 mole/l of gypsum at 55° C. in the case (II), where 0.06 mole/l of zinc sulfate and 0.04 mole/l of magnesium sulfate are coexisting and in the case (I), where no sulfate is coexisting, respectively.

FIG. 1 indicates the relationship between the quantity of the sulfuric acid added and the pH of the absorption liquid, which was observed when sulfuric acid was successively added to each of absorption liquid (II) prepared by adding 0.06 mole/l of zinc sulfate and 0.04 mole/l of magnesium sulfate to a slurry containing 0.3 mole/l of gypsum and absorption liquid (I), prepared by adding no sulfate to the above slurry. From the figure it is found that in order to obtain the same pH value addition of about 3 times larger amount of sulfuric acid is required in absorption liquid (II) containing the sulfate added as compared with absorption liquid (I) containing no sulfate, indicating that sulfate has clearly a buffering action for the pH of the absorption liquid.

Figure 2:
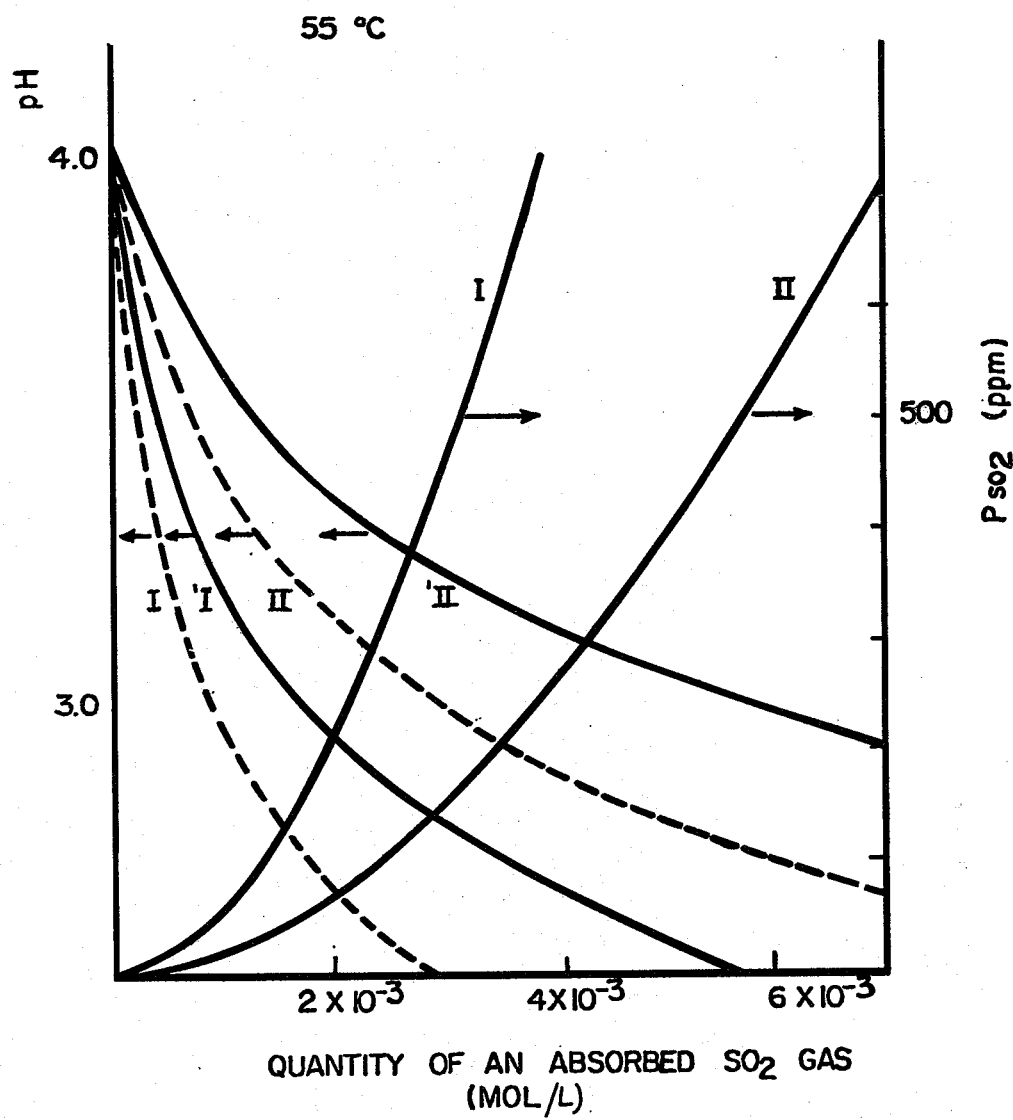
FIG. 2 indicates the relationship between the quantity of the absorbed sulfur dioxide gas and the pH of the slurry as well as the relationship between the quantity of the absorbed sulfur dioxide gas and the equilibrium vapor pressure of the sulfur dioxide gas, both of which were observed when the gypsum slurry (II) containing 0.1 mole/l of sulfates in FIG. 1 and the gypsum slurry (I) containing no sulfates both adjusted to pH 4 by acidifying with sulfuric acid were respectively allowed to absorb sulfur dioxide gas. In the figure broken lines indicate the values observed in the case where the absorption of the sulfur dioxide gas was carried out in the coexistence of oxygen, while solid lines indicate the values observed in the case where the absorption was carried out under the oxygen-free condition.

Further, FIG. 2 indicates the relationship between the quantity of the absorbed sulfur dioxide gas and the pH of the solution as well as the relationship between the quantity of the absorbed sulfur dioxide gas as above and the equilibrium vapor pressure of said sulfur dioxide gas, respectively, both of which were observed when the above described absorption liquids (I) and (II), of which the pH had been adjusted to 4 by acidifying with sulfuric acid, were respectively allowed to absorb sulfur dioxide gas at 55° C. In the figure solid lines indicate the values observed in the case where the absorption of the sulfur dioxide gas was carried out under the oxygen-free condition, while broken lines indicate the values observed in the case where the absorption was carried out in the presence of oxygen.

Seeing from the data obtained, the effects of the addition of sulfate to the slurry absorbent are such that when compared under the condition that the quantity of the absorbed sulfur dioxide gas is constant the equilibrium vapor pressure of the sulfur dioxide in the case of addition of sulfate is about $\frac{1}{3}$ of that in the case of no addition of sulfate, and also, when compared under the condition that the equilibrium vapor pressure of the sulfur dioxide is constant the quantity of the absorbed sulfur dioxide gas in the case of addition of sulfate is about twice that in the case of no addition of sulfate. That is to say, it is indicated that by virtue of addition of sulfate sulfur dioxide gas can be absorbed in an extremely high efficiency even from an exhaust gas containing it in a low concentration.

The presence of oxygen is outstandingly effective in order to positively oxidize the absorbed bisulfite ion into bisulfate ion and to efficiently recover it as gypsum. As clearly shown by FIG. 2, it is found as a matter of course that the lowering of pH is marked in the case of presence of oxygen than in the case of absence of oxygen. Even in such a case, if the sulfate is not added, the pH immediately decreases to less than 2.5 by the absorption of small quantities of sulfur dioxide gas, resulting in a decreased absorption efficiency, and moreover the oxidation of the sulfurous acid becomes inefficient. On the other hand, if the sulfate is added, as clearly seen from FIG. 2, the pH never decreases to less than 2.5 even when the quantity of the absorbed sulfur dioxide gas is more than $7 \times 10^{-3}$ mole/l, so that the pH can be readily controlled in the range of 4–2.5.

Figure 3:
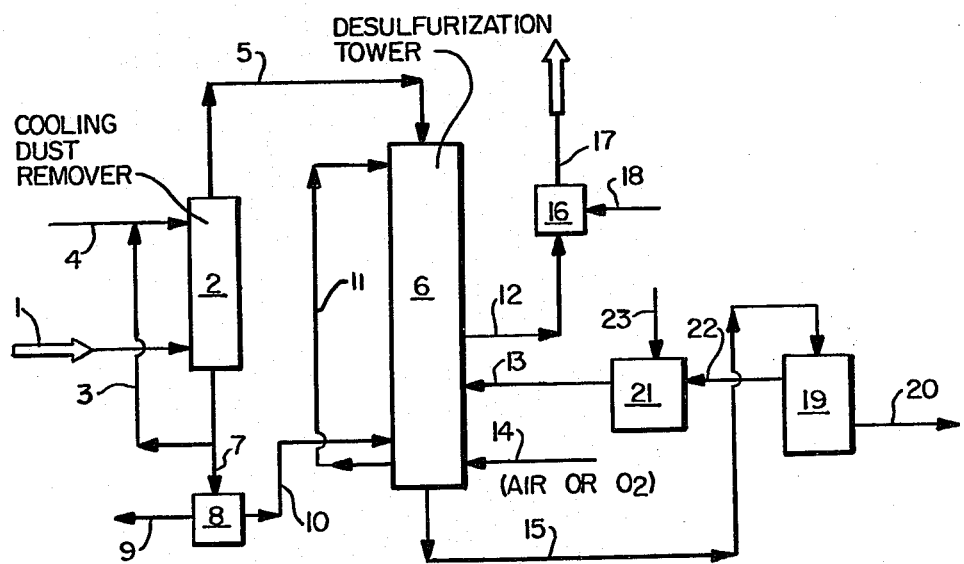
FIG. 3 further indicates the overall process as one embodiment of the process of this invention illustrating its outline in practice.

With further reference to a flow sheet the process of this invention will be explained as follows. FIG. 3 indicates the simplified overall process for desulfurization of exhaust gases including oxidation to sulfuric acid as one embodiment of the process of this invention, but it should be understood that the process of this invention is not always limited to such an illustrative example. FIG. 3 illustrates that the exhaust gas coming from boilers, heating furnances, etc. is usually fed to cooling dust remover 2 via line 1 at a temperature of 130°–180° C. In said cooling dust remover cooling water is circulated via line 3 together with a small quantity of water supplied for making up via line 4, and the exhaust gas is cooled to 50°–60° C. for dust removal directly by water cooling, and then fed to desulfurization tower 6 via line 5. The major part of the solution in cooling dust remover is repeatedly used for the cooling dust removal via line 3 with making up water. The pH of the circulating water used for cooling and washing attains 1.0–2.0. Portion of the solution in line 3 is continuously sent to dust separator 8 via line 7 for the purpose of removing the dust such as carbon etc. that are dispersed as insolubles in the solution, and then withdrawn via line 9 after the dust separation. The dust-free solution is fed to desulfurization tower 6 via line 10. In said desulfurization tower the exhaust gas from cooling dust remover 2 contacts with the slurry absorbent circulated via line 11, whereby the sulfur oxides are absorbed. In general, the concentration of the sulfur dioxide gas in the gas to be treated in an exhaust gas desulfurization apparatus is 1000–2000 ppm, $SO_3$ is 3–4% on the basis of the sulfur dioxide gas, and other gases contained are about 10% of carbon dioxide, about 7% of oxygen due to excess air, and about 180 ppm of $NO_x$. The sulfur dioxide gas is absorbed according to the reaction represented by equation (1), and oxidized into bisulfate ion by the excess air in the exhaust gas as well as by the air or oxygen supplied via line 14 for the purpose of both stirring the slurry and oxidizing the bisulfite ion contained therein according to the reaction represented by equation (9). The $NO_x$ contained in the exhaust gas favorably affects the oxidation of the sulfur dioxide gas. Also, the $SO_3$ in the exhaust gas is absorbed and converted to bisulfate ion according to the reaction of equation (9). These bisulfate ion portions form gypsum by the reaction with the lime slurry which is continuously fed via line 13 in an amount calculated, as shown by equation (11), and thus the absorption capacity of the slurry absorbent for sulfur oxides can be maintained unchanged. The slurry absorbent in the desulfurization tower is a gypsum slurry which has a pH value of 4–2.5 containing the particular sulfate as has already been explained. The exhaust gas purified in this desulfurization tower 6 is withdrawn via line 12, and after having been heated to 80°–150° C. by means of reheater 16 so as to augment the ascending diffusion power, it is released into the atmosphere. Portion of the slurry is sent to gypsum separator 19 via line 15, where the gypsum is separated from the mother liquor and the gypsum is withdrawn via line 20, while the mother liquor is sent to lime slurry-preparing tank 21, where the lime slurry is prepared by adding to the mother liquor coming via line 22 the lime introduced via line 23 in an amount chemically equivalent to the sulfur oxides in the exhaust gas. The lime slurry thus obtained is fed to desulfurization tower 6 via line 13. The lime supplied for making up is preferably ground to a particle size of less than 100 microns.

What is claimed:

1. A process for the desulfurization of exhaust gas containing sulfur oxides comprising contacting the exhaust gas with a slurry of gypsum acidified with sulfuric acid to a pH of 4–2.5 and which contains 0.05–0.5 mole/l of at least one metal sulfate selected from the group consisting of zinc, copper and magnesium sulfates in the presence of oxygen, in a single reaction means, while adding lime to the slurry so as to effect the absorption and oxidation of said sulfur oxides and the simultaneous deposition of gypsum.

2. The process as defined in claim 1, wherein the concentration of gypsum solids in said slurry of gypsum is 0.1–1.5 mole/l.

3. A process for the desulfurization of exhaust gas containing sulfur oxides comprising contacting the exhaust gas with a slurry of gypsum acidified with sulfuric acid to a pH of 4–2.5 and which contains 0.05–0.5 mole/l of at least one metal sulfate selected from the group consisting of zinc, copper and magnesium sulfates and a catalytic amount of at least one metal ion selected from the group consisting of $Fe^{2+}$, $Ni^{2+}$, $Co^{2+}$ and $Mn^{2+}$ in the presence of oxygen, in a single reaction means, while adding lime to the slurry so as to effect the absorption and oxidation of said sulfur oxides and the simultaneous deposition of gypsum.

* * * * *